No. 791,905. PATENTED JUNE 6, 1905.
A. HIGGINBOTHAM.
PIPE COUPLING.
APPLICATION FILED JULY 7, 1904.
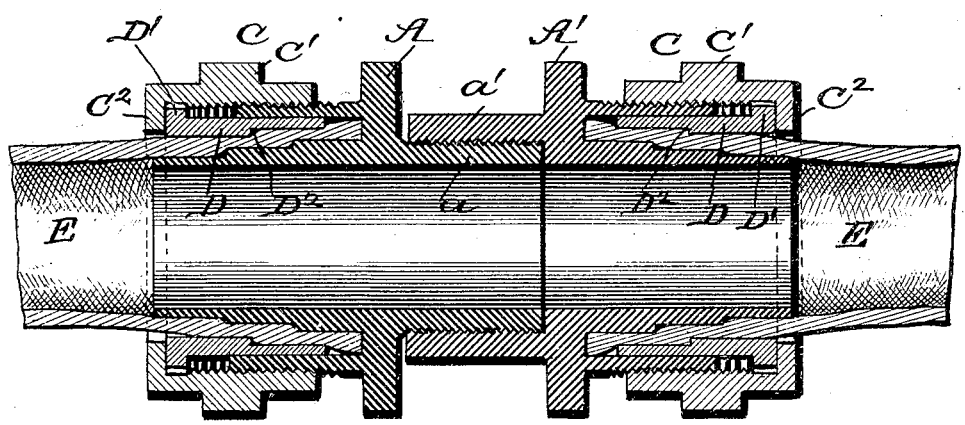
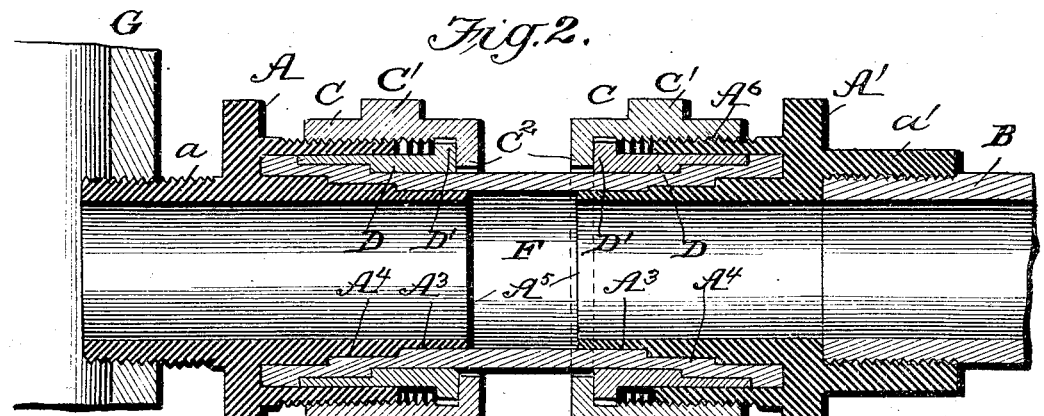
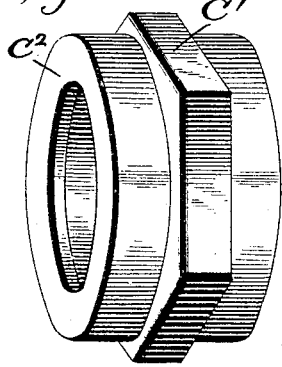
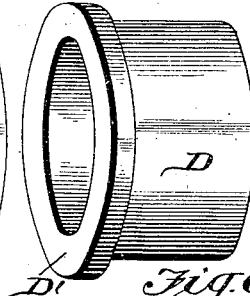
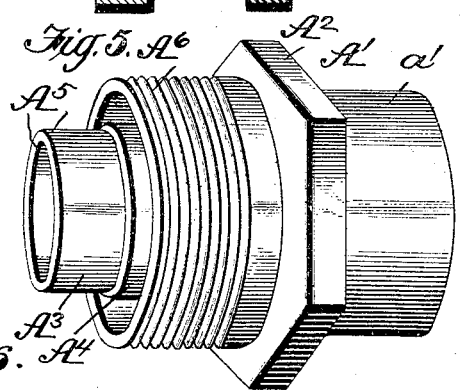
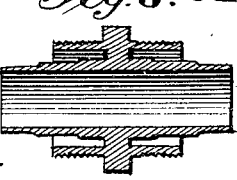
WITNESSES:
INVENTOR
Alfred Higginbotham.
BY Munn & Co.
ATTORNEYS No. 791,905. Patented June 6, 1905.

UNITED STATES PATENT OFFICE.

ALFRED HIGGINBOTHAM, OF LOCK NO. 4, PENNSYLVANIA.

PIPE-COUPLING.

SPECIFICATION forming part of Letters Patent No. 791,905, dated June 6, 1905.

Application filed July 7, 1904. Serial No. 215,621.

*To all whom it may concern:*

Be it known that I, ALFRED HIGGINBOTHAM, a citizen of the United States, and a resident of Lock No. 4, in the county of Washington and State of Pennsylvania, have made certain new and useful Improvements in Pipe-Couplings, of which the following is a specification.

My invention is an improvement in pipe-couplings, and has for an object to provide a novel construction adapted for use in coupling lead-pipe or flexible-hose sections and also useful in coupling a lead pipe or hose to an iron pipe; and the invention consists in certain novel constructions and combinations of parts, as will be hereinafter described and claimed.

In the drawings, Figure 1 is a longitudinal section of my invention applied for use in coupling flexible-hose sections. Fig. 2 is a similar view showing my improvements embodied in connecting a lead-pipe section with an iron pipe. Fig. 3 is a detail perspective view of the cover-section. Fig. 4 is a detail perspective view of the clamping-section. Fig. 5 is a detail perspective view of the main section, and Fig. 6 shows a coupling made in one section for connecting two sections of hose or lead pipe.

As shown in Figs. 1 and 2, the main sections A and A' are alike, except that the projecting nipple $a$ of the section A is threaded externally, while the nipple $a'$ of the section A' is threaded internally and is adapted to screw onto the nipple $a$ when the parts are adjusted as shown in Fig. 1 or on the threaded end of a pipe-section B when the parts are adjusted as shown in Fig. 2 of the drawings. Otherwise the sections A and B are alike, and the description of one will answer for both. As shown, the main sections are provided with an angular flange $A^2$ to receive a wrench or other suitable tool, and the nipples $a$ or $a'$ project to one side of the flange $A^2$. From the other side of the flange projects the inner tubular shank $A^3$, whose exterior is generally tapered and is roughened on its outer side or formed with the shoulders $A^4$, which face toward the outer extremities $A^5$ of the tubular shanks $A^3$ and are opposed by corresponding shoulders on the clamping-sections presently described. The shanks $A^3$ taper generally on their outer sides toward their extremities $A^5$ to facilitate their insertion in the ends of pipes or hose, as will be understood from Figs. 1 and 2. An outer tube $A^6$ extends from the flange $A^2$ over the tubular shank $A^3$ and is threaded on its outer side to receive the cover-section C. (Shown in Figs. 1 and 2 and in detail in Fig. 3.) The cover-section C has an angular flange C' to receive a wrench or other tool, is threaded internally to screw on the threads of the outer tube $A^6$ of the main section, and is provided at its outer end with an inwardly-projecting flange $C^2$, which abuts the outer end or head of the clamping-section D, as shown in Figs. 1 and 2, and operates when screwed home to press the clamping-section tightly into the space between the outer tube and the tubular shank of the main section, as shown in Figs. 1 and 2 of the drawings. The clamping-section D is provided at its outer end with a head D' for engagement by the flange $C^2$ of the section C and is shouldered internally at $D^2$, with the shoulder facing the point of the clamping-section or end opposite the head D', as shown in Figs. 1 and 2. When the parts are applied as shown in either Figs. 1 or 2 and the cover-section is screwed up tightly on the threaded outer tube of the main section, the clamping-section will be forced inwardly to bind the flexible-hose sections E, as shown in Fig. 1, or the lead-pipe section F, as shown in Fig. 2.

In the arrangement of parts shown in Fig. 1 the couplings are adjusted to connect two sections of flexible hose E, the main sections A and A' being threaded together, the ends of the hose-sections being slipped over the tubular shanks $A^3$ and between the same and the outer tubes $A^6$, previous to which the cover-tube and the clamping-section have been slipped back on the hose-sections E, and the clamping-sections are now pressed into the space between the hose-section E and the outer tube $A^6$ of the main section, and the cover-section is brought up and screwed onto the outer tube of the main section, pressing the clamping-section firmly home and securing the hose-sections E in place, as desired.

In the construction shown in Fig. 2 the main section A has its nipple $a$ screwed into an iron pipe G, and the section A' has its nipple $a'$ screwed onto the end of a pipe B, and a lead-pipe section F is secured at its opposite ends by the shanks, clamping-sections, and cover-sections, applied in substantially the same manner they are in Fig. 1 and as before described.

The construction is simple, easily applied, and, as will be understood from the drawings and previous description, may be readily adapted for coupling hose-sections or lead pipe or with iron pipes, as may be desired.

In Fig. 6 I show a coupling for connecting two sections of hose or lead pipe and made with one main section, having an intermediate angular flange to receive the wrench while operating the cover-section.

Having thus described my invention, what I claim as new, and desire to secure by Letters Patent, is—

1. A pipe-coupling substantially as herein described consisting of two main sections having angular flanges whereby they may be turned and provided one with a projecting nipple threaded externally and the other with a projecting nipple threaded internally to screw on the nipple of the other section, said sections being also provided at their ends opposite their respective nipples with inner tubular shanks tapered generally on their outer sides and shouldered on said sides with the shoulders facing toward their free extremities and with the outer tubes extending over the tubular shanks and threaded on their outer sides to receive the cover-sections, the clamping-sections shouldered on their inner faces toward their inner or point ends to oppose and coöperate with the shoulders on the tubular shanks of the main sections, and the cover-sections threaded internally to screw on the outer tubes of the main sections and provided at their outer ends with inwardly-projecting flanges to abut the outer ends or heads of the clamping-sections substantially as and for the purposes set forth.

2. In a pipe-coupling substantially as described the combination with a main section having an inner tubular shank adapted to enter a pipe-section and tapered on its outer side and provided with an outer tube projecting over the said tubular shank and threaded on its outer side, a clamping-section tapered on its inner side to coöperate with the shank on the main section said tubular shank and clamping-section having opposing projections and a cover-section screwing on the outer tube of the main section and provided at its outer end with an inwardly-projecting flange to abut the outer end or head of the clamping-section substantially as set forth.

3. The improved pipe-coupling herein described comprising a main section having an inner tubular shank adapted to enter a pipe-section and having a generally tapered form toward its outer end and provided on its outer side with shoulders facing toward such outer end of the tubular shank, the main section being also provided with an outer tube projecting over the tubular shank and threaded on its outer side and having its inner side approximately cylindrical, the clamping-section in the form of a closed unbroken tube having its outer side approximately cylindrical to fit within the outer tube of the main section and having its inner side tapered generally toward its free end and shouldered on said inner side to oppose and coöperate with the shouldered shank of the main section, said clamping-section being provided at its outer end with an outwardly-projecting flange and the cover-section threaded on the outer tube of the main section and provided at its outer end with an inwardly-projecting flange overlapping the outwardly-projecting flange of the clamping-section substantially as and for the purpose set forth.

ALFRED HIGGINBOTHAM.

Witnesses:
 MINNIE B. RICHARDSON,
 C. E. KNOCH.